Dec. 15, 1970     W. HALL     3,548,185

LIGHT EMITTING VEHICLE WHEEL COVER

Filed Sept. 18, 1968     2 Sheets-Sheet 1

INVENTOR

WILBERT HALL

ATTORNEY

Dec. 15, 1970 W. HALL 3,548,185
LIGHT EMITTING VEHICLE WHEEL COVER
Filed Sept. 18, 1968 2 Sheets-Sheet 2

INVENTOR
WILBERT HALL
Richards, Harris & Hubbard
ATTORNEY

United States Patent Office 3,548,185
Patented Dec. 15, 1970

3,548,185
LIGHT EMITTING VEHICLE WHEEL COVER
Wilbert Hall, 11608 Oak Trail, Austin, Tex. 76688
Filed Sept. 18, 1968, Ser. No. 760,580
Int. Cl. B60q 1/00; F16c 15/00
U.S. Cl. 240—8.12
12 Claims

ABSTRACT OF THE DISCLOSURE

An electrical generator having a rotor and a stator is supported by coupling structure connected to the rotor adjacent a vehicle axle. A pendulum extends from the stator for maintaining the stator fixed while the rotor is rotated by the vehicle axle. One or more lamps are mounted for energization by the electrical energy produced by the electrical generator. A wheel cover adapted to emit light encloses the generator and the one or more lamps.

BACKGROUND OF THE INVENTION

This invention relates to vehicle wheel accessories, and more particularly to vehicle wheel structure which generates electrical power for energization of lamps mounted on the wheels.

Efforts are continuously being made by car enthusiasts to improve the appearance of their vehicles by the addition of novelty accessories. Some of the greatest efforts in this area are directed to vehicle wheel covers, and a large number of different shapes and configurations of wheel covers have thus heretofore been developed. However, due to the rotation of the vehicle wheels, it has not been heretofore practical to provide electrical power to vehicle wheels in order to energize energy consuming accessories.

SUMMARY OF THE INVENTION

In accordance with the present invention, an electrical generator having a rotor and a stator is supported by the rotor at the axis of a rotatable shaft. A pendulum extends from the stator for maintaining the stator in a fixed position while the rotor is rotated by the rotatable shaft. A lamp is mounted for energization by the generator.

In a more specific aspect of the invention, an electrical generator is mounted at its rotor adjacent the axis of a vehicle wheel. A pendulum extends from the stator in order to maintain the stator fixed while the rotor is rotated by the vehicle wheel. One or more lamps are mounted for energization by the generator, with a light emitting wheel cover attached to the vehicle wheel enclosing the generator and the lamps.

BRIEF DESCRIPTION OF THE DRAWINGS

For a more complete understanding of the present invention and for further objects and advantages thereof, reference is now made to the following description taken in conjunction with the accompanying drawings, in which.

DESCRIPTION OF THE PREFERRED EMBODIMENTS

Figure 1:
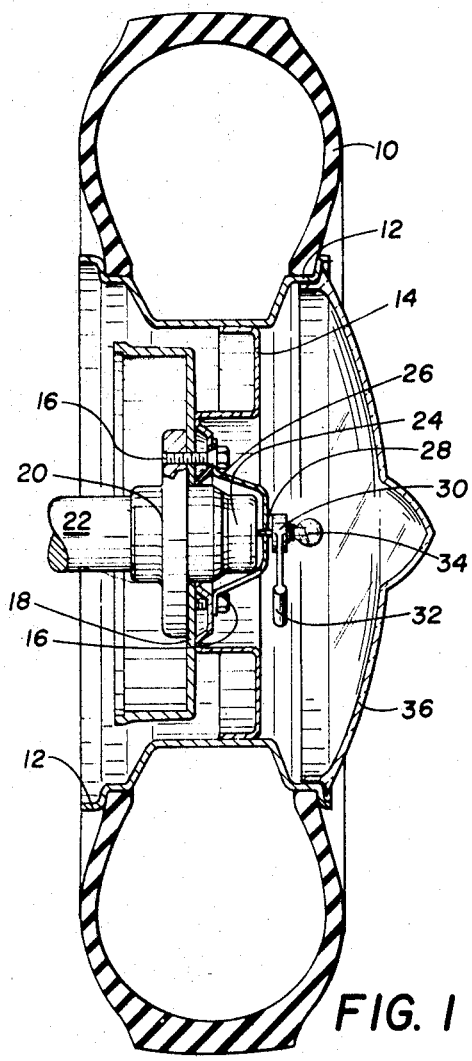
FIG. 1 illustrates a partially sectioned view of the present light emitting wheel.

Referring to FIG. 1, an automobile tire 10 is disposed on a conventional hub 12 which includes an annular plate 14 having a plurality of lug bolt holes disposed symmetrically therein. Lug bolts 16 pass through the annular plate 14 and are threadedly received within a wheel support member 18 and axle plate 20. The automobile axle 22 is fixed to the axle plate 20 and terminates in the axle cap 24.

The invention comprises a generally Y-shaped support bracket 26 which is connected to the annular plate 14 by the lug bolts 16. The support bracket 26 supports a rotor 28 of an electrical generator. The stator 30 of the electrical generator is thus freely rotatable with respect to the rotor 28. A pendulum member 32 depends from the stator 30, and a lamp 34 is attached to the stator 30. Leads, not shown, connect the lamp 34 to the output of the stator 30. A translucent wheel cover 36 is connected to the hub 12 to enclose the light emitting system. In operation of the invention, rotation of the vehicle wheel will cause rotation of the rotor 28, while the stator 30 is maintained in a relatively fixed position by the pendulum 32. The electrical generator will thus emit electric current which energizes the lamp 34. Light from the lamp 34 is emitted from the translucent wheel cover 36 to provide a pleasing effect.

Figure 2:
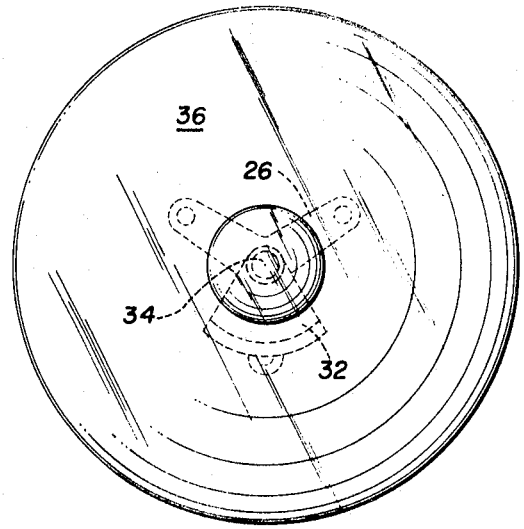
FIG. 2 is a front view of a portion of the wheel shown in FIG. 1.
Figure 3:
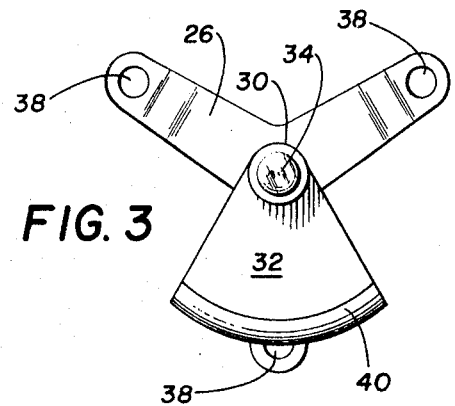
FIG. 3 is an enlarged front view of the light emitting structure shown in FIG. 1.
Figure 4:
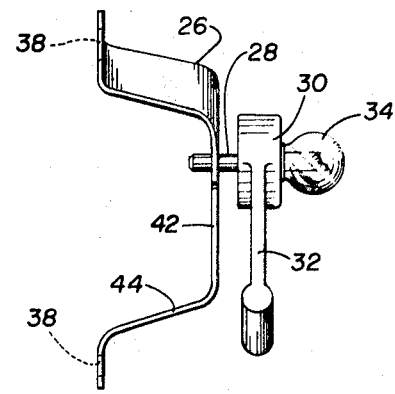
FIG. 4 is an enlarged side view of the light emitting structure shown in FIG. 3.

FIGS. 2–4 will serve to better illustrate the operation of the light emitting system. FIG. 2 illustrates the translucent wheel cover 36, wherein it may be seen that the bracket 26 mounts the electrical generator at the axis of the vehicle wheel to provide rotation of the rotor of the electrical generator. It will of course by understood that the shape and configuration of the wheel cover 36 could be substantially varied. The wheel cover 36 is preferably constructed from a plastic material or the like which emits the light from the lamp 34. The plastic material utilized for the wheel cover 36 may be colored according to taste.

As shown in FIG. 3, the bracket 26 comprises three radially extending arms each of which has an aperture 38 therein for reception of a lug bolt. The shape of the pendulum 32 may be varied to provide various operating characteristics, but the illustrated generally triangular shape is advantageous to maintain the stator 30 generally stationary during relatively high rotation of the vehicle wheel. A curved portion 40 is provided on the lower part of the pendulum 32 to provide sufficient weight to maintain the stator 30 in a fixed position. The light emitting device may be easily attached to an existing vehicle wheel due to the fact that the bracket 26 utilizes existing lug bolts for connection.

FIG. 4 illustrates a somewhat enlarged side view of the light emitting system. It may be seen that the bracket 26 comprises a relatively flat center portion 42 for fixed attachment to the rotor 28. The legs of the bracket 26 include bend portions 44 to enable the bracket to clear the axle cap 24. Lamp 34 is illustrated as being supported by the stator 30, but it will be understood that lamp 34 could be mounted on an end of the rotor 28 and allowed to rotate therewith if desired.

The electrical generator comprises any one of a number of suitable D.C. generators wherein an armature-carrying conductor is rotated in a magnetic field to induce an emf in the conductors. A suitable commutator and brush configuration provides direct current to the lamp 34 for energization thereof.

Figure 5:
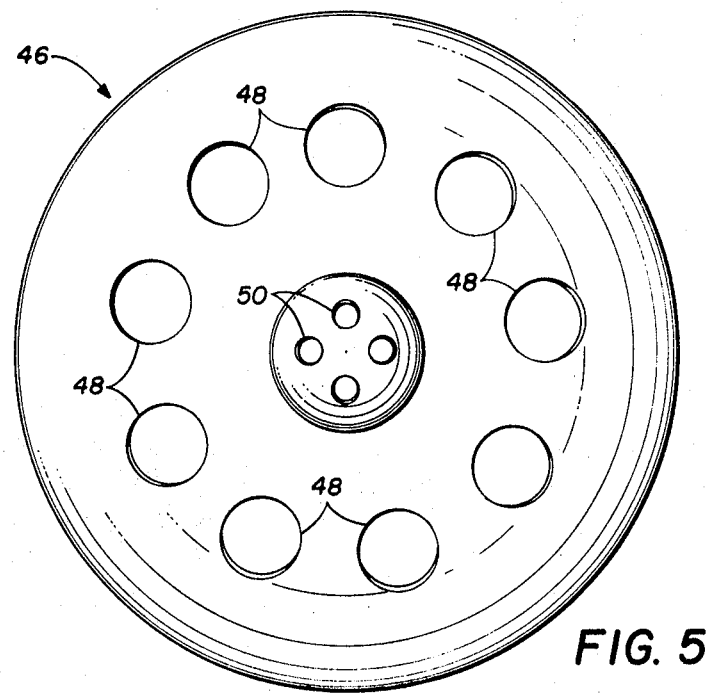
FIG. 5 is a view of another embodiment of a wheel cover adapted for use with the system shown in FIG. 1.

FIG. 5 illustrates another embodiment of a wheel cover 46, wherein apertures 48 and 50 are symmetrically disposed through the wheel cover. The light emitted by the lamp enclosed by the wheel cover is emitted through the apertures 48 to provide a pleasing effect. Wheel cover 46 may be constructed from a non-translucent material, such as metal or alternatively may be constructed from a plastic material. It will be understood that various combinations of cutout portions may be provided in the wheel cover, as for example, combinations of radially extending slots.

Figure 6:
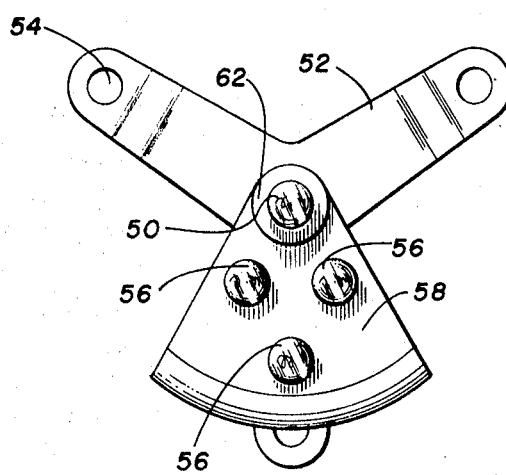
FIG. 6 is a front view of another embodiment of the present light emitting device.

FIG. 6 illustrates another embodiment of the light emitting structure of the invention. The support member 52 is shaped in generally the same manner as that previously described, with apertures 54 being provided for connection to a vehicle wheel by the existing lug bolts. Other configurations of the support 52 may also be provided. For example, more or less than three radially extending arms may be provided to support the electrical generator.

FIG. 6 illustrates a plurality of lamps 56 disposed on the pendulum member 58, with lamp 60 attached to the stator 62 of the electrical generator. Conductors, not shown, extend from the output of the electrical generator to the lamps 56 and 60 for energization thereof. The provision of multiple lamps in the system generates a pleasing light pattern which is emitted through the wheel cover as the vehicle travels.

The present invention thus provides a relatively simple, yet durable attachment to vehicle wheels to improve the appearance of the vehicle. Due to the fact that the lamps of the device are energized only when the vehicle moves, little problem is encountered with lamp bulb replacement. No external source of energy is required by the device due to the operation of the electrical generator which is driven by the rotation of the vehicle wheel. It will be understood that the electrical power provided by the electrical generator according to the invention could be utilized to drive other devices attached to vhicle wheels, such as sound sources or the like. The device in accordance with the invention could also be utilized in order to provide illumination for devices in other environments.

Whereas the present invention has been described with respect to specific embodiments thereof, it will be understood that various changes and modifications will be suggested to one skilled in the art, and it is desired to encompass such changes and modifications as fall within the true scope of the appended claims.

What is claimed is:

1. In a system energized by a rotatable shaft, the combination comprising:
    (a) an electrical generator having a rotor and a stator,
    (b) means for supporting said generator by said rotor at the axis of said rotatable shaft,
    (c) pendulum means for maintaining said stator fixed while said rotor is rotated by said rotatable shaft, and
    (d) means mounted for energization by said generator.

2. The combination of claim 1 wherein said pendulum means comprises a weighted member connected at one end to said stator by extension structure.

3. The combination of claim 1 wherein said means mounted for energization comprises lamp means.

4. The combination of claim 3 and further comprising: a cover adapted to emit light extending over said lamp means and connected for rotation with said rotatable shaft.

5. A light emitting system for a vehicle wheel comprising:
    (a) an electrical generator having a rotor and a stator,
    (b) coupling structure for mounting said generator by said rotor adjacent the vehicle axle,
    (c) means for maintaining said stator fixed while said rotor is rotated by said vhicle axle,
    (d) lamp means mounted for energization by said generator, and
    (e) wheel cover means adapted for the emission of light connected to the vehicle wheel and enclosing said lamp means.

6. The system of claim 5 wherein said wheel cover means is translucent.

7. The system of claim 5 wherein said wheel cover means has apertures defined therethrough for emission of light.

8. The system of claim 5 wherein said lamp means is mounted on said generator.

9. The system of claim 5 wherein said coupling structure comprises: a bracket connected at a central portion to said rotor and connectable at peripheral portions to the vehicle wheel such that said rotor is mounted at the axis of the vehicle axle.

10. The system of claim 9 wherein said bracket is connectable to the vehicle wheel by the wheel lug bolts.

11. The system of claim 10 wherein said bracket comprises three radially extending arms each adapted to be connected by said wheel lug bolts.

12. The system of claim 5 wherein said means for maintaining said stator fixed comprises a pendulum connected to said stator.

References Cited

UNITED STATES PATENTS

| | | | |
|---|---|---|---|
| 1,739,577 | 12/1929 | Cantu | 240—8.12UX |
| 2,299,762 | 10/1942 | McDermott | 315—78 |
| 2,505,154 | 4/1950 | Smith | 315—78 |
| 3,340,389 | 9/1967 | Senseman | 240—8.12 |

JOHN M. HORAN, Primary Examiner

J. F. PETERS, Jr., Assistant Examiner

U.S. Cl. X.R.

240—7.1; 280—150; 310—73, 91; 315—78